United States Patent
Stesco (10) Patent No.: US 12,241,649 B2
(45) Date of Patent: Mar. 4, 2025

(54) MPC FOR HVAC WITH THERMAL MODEL SELECTION

(71) Applicant: GENERAC POWER SYSTEMS, INC., Waukesha, WI (US)

(72) Inventor: Thomas William Dupuis Stesco, Toronto (CA)

(73) Assignee: GENERAC POWER SYSTEMS, INC., WI (US)

( * ) Notice: Subject to any disclaimer, the term of this patent is extended or adjusted under 35 U.S.C. 154(b) by 0 days.

(21) Appl. No.: 17/591,005

(22) Filed: Feb. 2, 2022

(65) Prior Publication Data
US 2023/0243541 A1 Aug. 3, 2023

(51) Int. Cl.
| | |
|---|---|
| F24F 11/64 | (2018.01) |
| F24F 11/38 | (2018.01) |
| F24F 11/47 | (2018.01) |
| G05B 13/04 | (2006.01) |
| G05B 15/02 | (2006.01) |
| F24F 140/60 | (2018.01) |

(52) U.S. Cl.
CPC .............. *F24F 11/64* (2018.01); *F24F 11/38* (2018.01); *F24F 11/47* (2018.01); *G05B 13/04* (2013.01); *G05B 15/02* (2013.01); *F24F 2140/60* (2018.01)

(58) Field of Classification Search
CPC .. F24F 11/64; F24F 11/38; F24F 11/47; F24F 2140/60
See application file for complete search history.

(56) References Cited

U.S. PATENT DOCUMENTS

| | | | |
|---|---|---|---|
| 2009/0063369 A1* | 3/2009 | Brown | G06Q 30/02 705/400 |
| 2014/0128997 A1* | 5/2014 | Holub | G05B 13/048 700/30 |
| 2016/0091904 A1* | 3/2016 | Horesh | F24F 11/58 700/276 |
| 2016/0179999 A1* | 6/2016 | Mitra | G06F 17/13 703/2 |
| 2019/0017721 A1* | 1/2019 | Motodani | F24F 11/64 |
| 2020/0132327 A1* | 4/2020 | Samuni | F24F 11/49 |
| 2020/0166230 A1* | 5/2020 | Ng | F24F 11/56 |
| 2020/0355391 A1* | 11/2020 | Wenzel | F24F 11/65 |
| 2021/0011443 A1* | 1/2021 | Mcnamara | F24F 11/0001 |
| 2021/0018198 A1* | 1/2021 | Alanqar | F24F 11/65 |
| 2021/0018205 A1* | 1/2021 | Ellis | F24F 11/47 |
| 2021/0061063 A1* | 3/2021 | Sun | F01P 3/02 |
| 2021/0141346 A1* | 5/2021 | Wenzel | G05B 13/041 |
| 2021/0158975 A1* | 5/2021 | Turney | G16Y 40/20 |

* cited by examiner

Primary Examiner — Tameem D Siddiquee
(74) Attorney, Agent, or Firm — Perry & Currier Inc.

(57) ABSTRACT

An example control device includes memory storing a first thermal model of a building and a second thermal model of the building, and a processor connected to the memory. The processor is configured to select the first thermal model or the second thermal model as a selected thermal model, and execute model predictive control (MPC) using the selected thermal model to control a heating, cooling, ventilation, and/or air conditioning (HVAC) apparatus at the building.

18 Claims, 7 Drawing Sheets

MPC FOR HVAC WITH THERMAL MODEL SELECTION

BACKGROUND

Control of heating, cooling, ventilation, and/or air conditioning (HVAC) apparatuses is generally reactive to the HVAC conditions in a building concerned. If building temperature is lower than a setpoint, then a furnace or heater may be turned on. When the building temperature meets the setpoint, the furnace or heater may be turned off. Various control techniques are used to ensure that the process of matching a setpoint is as efficient and as comfortable to building occupants as possible.

DETAILED DESCRIPTION

Model predictive control (MPC) may be used to control a building's HVAC apparatus with improved efficiency and comfort. However, MPC is much more complicated to implement than traditional control techniques. MPC uses a thermal model of a building with constraints and disturbances to account for various factors that influence HVAC operations. Complex thermal models, while accurate, may be impractical to implement at scale. In addition, the computational resources required to execute MPC with as complex model can be excessive. A high amount of processing resources may be required. In addition, network bandwidth and outages may become limiting factors when MPC is performed remote from the building.

The present invention concerns techniques to reduce computational resources required to operate MPC while retaining accuracy and other benefits of MPC. The present invention uses linear thermal models and selects a given thermal model for operation for a particular setpoint, operating mode, or time. This also allows MPC to be performed at a resource-limited computing device at the building (i.e., at the edge of a network) in a cost-effective and efficient manner.

Figure 1:
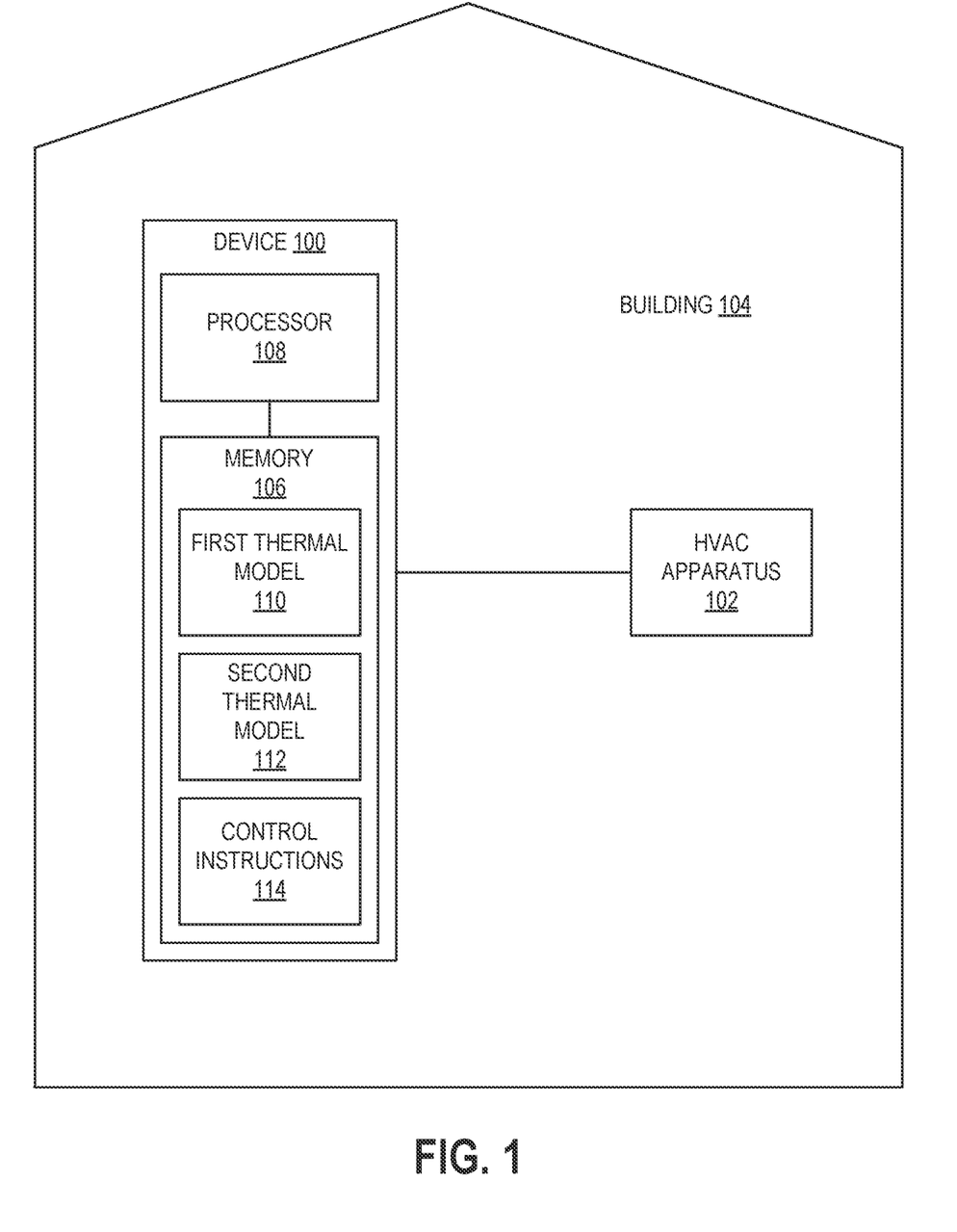
FIG. 1 is a block diagram of an example HVAC control device according to the present invention.

FIG. 1 shows an example device 100 to control an HVAC apparatus 102 at a building 104. The device 100 may be capable of controlling a furnace, air conditioner, humidifier, dehumidifier, vent, electric heater, boiler, fan, filter, pump, heat exchanger, diffuser, duct, pipe, or combination of such (generally referred to as "HVAC apparatus"). When intended to control the internal temperature of a building 104, the device may be referred to as a thermostat. Despite its name, a thermostat may also control other HVAC conditions, such as humidity and ventilation.

The device 100 includes memory 106 and a processor 108 connected to the memory 106. The memory 106 may include a combination of volatile and non-volatile memory, which may be generally referred to as a non-transitory machine-readable medium. The memory 106 may include random-access memory (RAM), read-only memory (ROM), electrically erasable programmable read-only memory (EEPROM), flash memory, or similar device capable of storing information. The processor 108 cooperates with the memory 106 to execute instructions to carry out the functionality discussed herein. The processor 108 may include a central processing unit (CPU), a microcontroller, a microprocessor, a field-programmable gate array (FPGA), an application-specific integrated circuit (ASIC), or similar device capable of executing instructions. Instructions may include directly executed instructions, such as a binary sequence or machine code. Instructions may include interpretable code, bytecode, source code, or similar instructions that may undergo additional processing to be executed. All of such examples may be considered processor-executable instructions.

The device 100 may be relatively small and may take the form of a digital thermostat attachable to a wall of the building 104 or placeable on a surface, such as a table or shelf, inside the building 104. The processor 108 and memory 106, particularly the non-volatile memory, may be limited in computational resources and processing speed due to the size constraints of the device 100 and cost-constraints when the device 100 is intended to be deployed to a large number of buildings 104.

The memory 106 stores a first thermal model 110 and a second thermal model 112 of the building 104. Each of the thermal models 110, 112 is a model predictive control (MPC) model. Any suitable number of thermal models 110, 112 may be used with two merely being an example. In various examples, each of the thermal models 110, 112 is a linear MPC model, which is particularly useful with the limited computational resources provided by the device 100.

Each of the thermal models 110, 112 may model a building envelope of the building 104, an operational output of the HVAC apparatus 102, and any suitable number of disturbances. Objectives and constraints may be applied to MPC performed with a thermal model 110, 112.

A building envelope may be modeled to account for heat transfer between the building and environment via conduction, convection, and radiation. The building envelope may be specific to the building 104 or specific to a class of buildings to which the building 104 belongs (e.g., apartment, detached two-story house, etc.).

The operational output of the HVAC apparatus 102 may be modelled as an input and/or output of energy and/or mass in the form of heating of mass present at the building, cooling of mass present at the building, input of heated mass into the building, output of heated mass from the building, input of cooled mass into the building, output of cooled mass from the building, where such mass may have constituents, such as air, water, water vapor, heat exchange fluid, etc. The operational output of the HVAC apparatus 102 may also consider other characteristics of the HVAC apparatus 102, such as operational modes (e.g., on/off, degrees of heating/cooling).

Examples of disturbances include solar heating of the building 104, outdoor ambient temperature, wind in the vicinity of the building 104, the presence or absence of occupants of the building 104, heat generation by appliances present in the building 104, and the opening/closing of internal and/or external doors of the building 104. Some disturbances may be referred to as internal gains or internal generation, and these typically concern heat generated by people or appliances within the building.

A disturbance may be a measured disturbance, such as a disturbance directly measured at the building 104 or a disturbance defined by data measured by another party or by data that generally characterizes a known quantity or trend. For example, solar heating may be measured by a solar panel present at the building 104 (e.g., by its reported power output), a photodiode at the building 104, solar intensity data that may be captured by another party and provided to the device 100, or historic solar intensity data that may be provided to the device 100. Wind and ambient temperature may be similarly directly measured or characterized whether contemporaneously or historically. Online data sources may be connected to the device 100 to provide this data. The presence/absence of building occupants, heat generation by appliances, and the opening/closing of doors may be measured by respective sensors, such as motion sensors, door sensors, and sensors at the appliance, or may be approximated by proxy sensors (e.g., a motion sensor in a kitchen may indicate kitchen appliance usage) or characterized by time or day and/or day of week/month/year (e.g., heat generation at the building by occupants may be considered to be absent or reduced during the work day). In any case, a disturbance may be directly measured or may be indirectly measured or characterized by known or inputted quantities or trends, whether seasonal, scheduled, or otherwise.

Occupancy disturbances may be considered at the room level and the thermal models 110, 112 may be configured accordingly. Sensors, such as motion sensors, and scheduling data may be used to measure or estimate room occupation to account for internal gains due to occupant body heat.

A thermal model 110, 112 may model the thermal mass of furniture in the building 104. The mass of furniture may be specific to the building 104 or specific to a class of buildings to which the building 104 belongs.

Each of the thermal models 110, 112 may be implemented with further considerations as discussed by Drgoňa et al. in "All you need to know about model predictive control for buildings," *Annual Reviews in Control* 50 (2020) 190-232, which is incorporated herein by reference.

The memory 106 may store control instructions 114 executable by the processor 108 to execute MPC with a selected one of the first and second thermal models 110, 112 to control the HVAC apparatus 102. The control instructions 114 may provide a control signal to the HVAC apparatus 102 based on MPC using the selected thermal model 110, 112.

The control instructions 114 may select the first or second thermal model 110, 112 for operational use based on the setpoint of the HVAC apparatus 102. For example, an HVAC apparatus 102, such as a furnace or air conditioner (AC), may have a temperature setpoint that is dictated by a schedule or manual input, which may accord to the wishes of the building occupant. If such a temperature setpoint exceeds a threshold, then the control instructions 114 select the first thermal model 110. If the temperature setpoint does not exceed the threshold, then the control instructions 114 select the second thermal model 110. As any suitable number of thermal models 110, 112 may be used, a corresponding number of setpoint thresholds may be established to select one of the thermal models 110, 112 for MPC. Selecting from among multiple linear thermal models 110, 112 may provide simplified MPC computation while maintaining control accuracy.

In an illustrative example of an office AC system operated during summer months in a northern latitude, a "cool" thermal model may be established for times when occupants desire cooling, such as during weekday office hours, and a "warm" thermal model may be established for times when cooling is less desired or not desired, such as at night or on weekends. The temperature setpoint for the AC system may be compared to a model-select threshold to switch between of the cool thermal model and the warm thermal model. The model-select threshold may be set between two normally expected setpoints. For example, the model-select threshold may be set at 74 F (about 23 C), so that when the AC setpoint is low (e.g., 70 F or about 21 C) the cool thermal model is selected, and when the AC setpoint is high (e.g., 77 F or 25 C) the warm thermal model is selected. As such, the cool and warm thermal models may provide specific MPC depending on the desired HVAC conditions inside the building.

The instructions 114 may configure the MPC with a comfort constraint and an objective to minimize an operating cost of the HVAC apparatus 102 due to the price of energy. The comfort constraint may limit acceptable deviation from a setpoint of the HVAC apparatus, time allowed to reach the setpoint, and similar factors that provide comfort to the occupants. The price of energy may be provided to the device 100 via user input or may be automatically obtained from a server via a network.

The instructions 114 may configure the MPC with a comfort constraint and an objective to minimize an operating cycle frequency of the HVAC apparatus 102. Minimizing on/off cycles of the HVAC apparatus 102 may extend its service life.

The instructions 114 may configure the MPC with a combination of reducing or minimizing both operating cost and operating cycle frequency of the HVAC apparatus 102.

The instructions 114 may execute the MPC at predetermined intervals, such as every 10 seconds, 15 seconds, 30 seconds, one minute, or five minutes. This may reduce the overall demand on the processor 108 and memory 106 while maintaining sufficient control accuracy for the HVAC apparatus 102.

Figure 2:
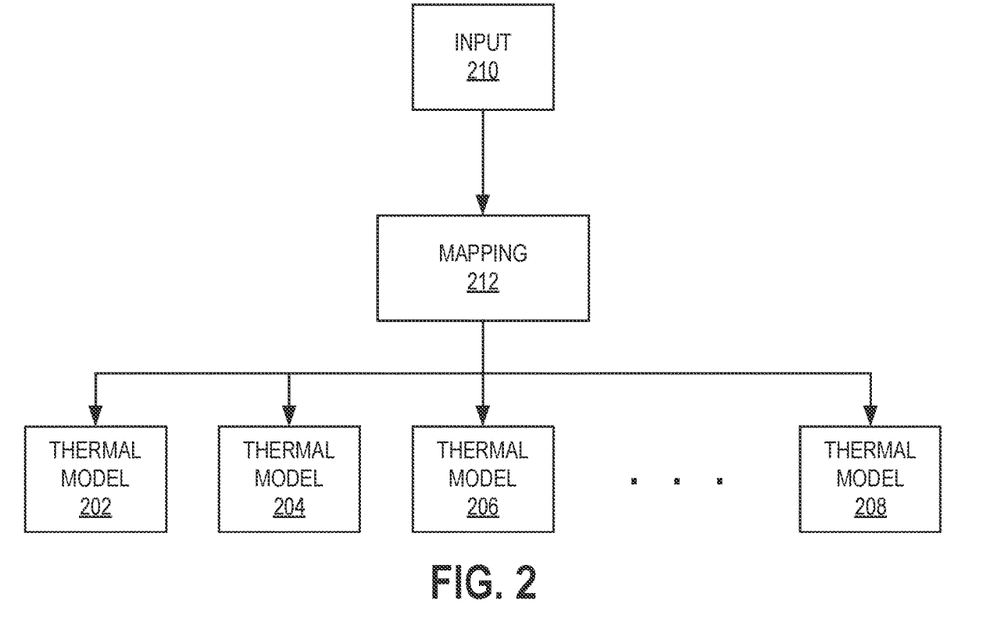
FIG. 2 is a diagram of an example mapping to select a thermal model based on an input according to the present invention.

FIG. 2 shows a generalized selection from among an ensemble of thermal models 202-208 based on an input 210, such as setpoint. A mapping 212 of input 210 to thermal model 202-208 may be established and stored at an MPC control device, such as device 100. The input 210 may be applied to the mapping 212 to select a thermal model 202-208 for operational use. A threshold is one example of a mapping 212. A thermal model 202-208 may be thus selected at predetermined intervals (e.g., periodically, regularly) during operation of an HVAC apparatus that is controlled by MPC.

Other model-selection inputs 210 that may be used include HVAC apparatus operational mode, time of day, day of week, and day of year. Distinct modes of operation may exist in HVAC devices such as a combination heating and AC unit, or in an HVAC device that uses different energy sources, such as a heater that uses different types of fuels. Time of day and day of week may be useful for buildings, such as offices, that have distinct periods of usage during the day or week. Day of year may be useful when seasonal differences are distinct. In any case, selection of a thermal model 202-208 from an ensemble based on an input 210 allows for a more precise matching of thermal model 202-208 to an expected set of conditions.

A mapping 212 may define a combination logic for plurality of different model-selection inputs 210. For example, a setpoint threshold may be different depending on the time of year. In such example, the mapping 212 may define a time-of-year threshold and a setpoint threshold that are respectively compared to a current time and a current setpoint of an HVAC apparatus to select a thermal model 202-208, which may number up to four, in this example, due to the four unique combinations provided by two independent thresholds.

Figure 3:
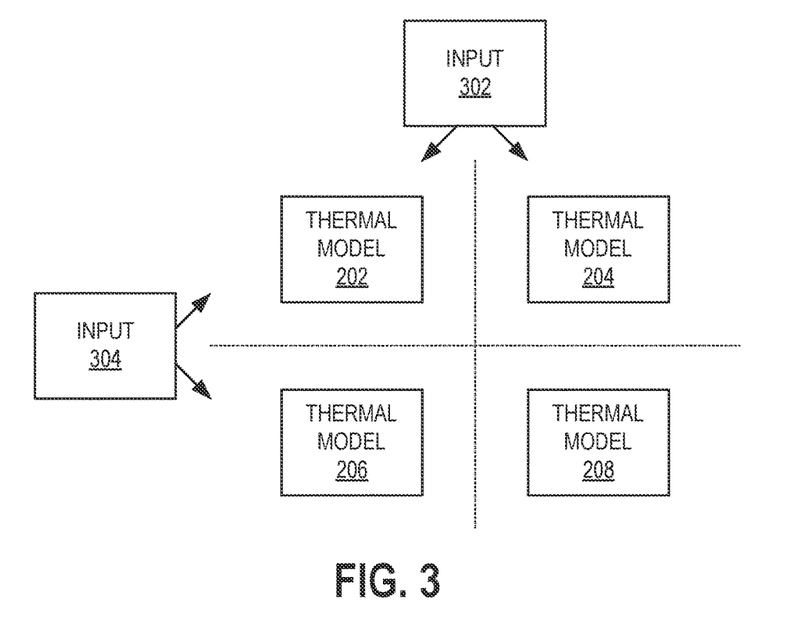
FIG. 3 is a diagram of example logic to select a thermal model based on several inputs according to the present invention.

FIG. 3 shows generally the selection of thermal models 202-208 using combination logic for two inputs 302, 304 for which an example has been given above. Naturally, this concept may be extended to any suitable number of inputs 304, 306. In addition, the thermal models 202-208 need not all be different. Various different combinations of inputs 304, 306 may select the same thermal model 202-208.

With reference back to FIGS. 1-3, the thermal models 110, 112, 202-208 are preferably linear thermal models to reduce the computational resources demanded of the device 100. The device 100 may thus be made compact and may be less obtrusive in the building. A large fleet of devices 100 may be deployed more efficiently with lower cost. Moreover, lower computational requirements reduce power consumed by the device 100, so the use of linear thermal models 110, 112, 202-208 provides a direct energy savings that may be significant.

Figure 4:
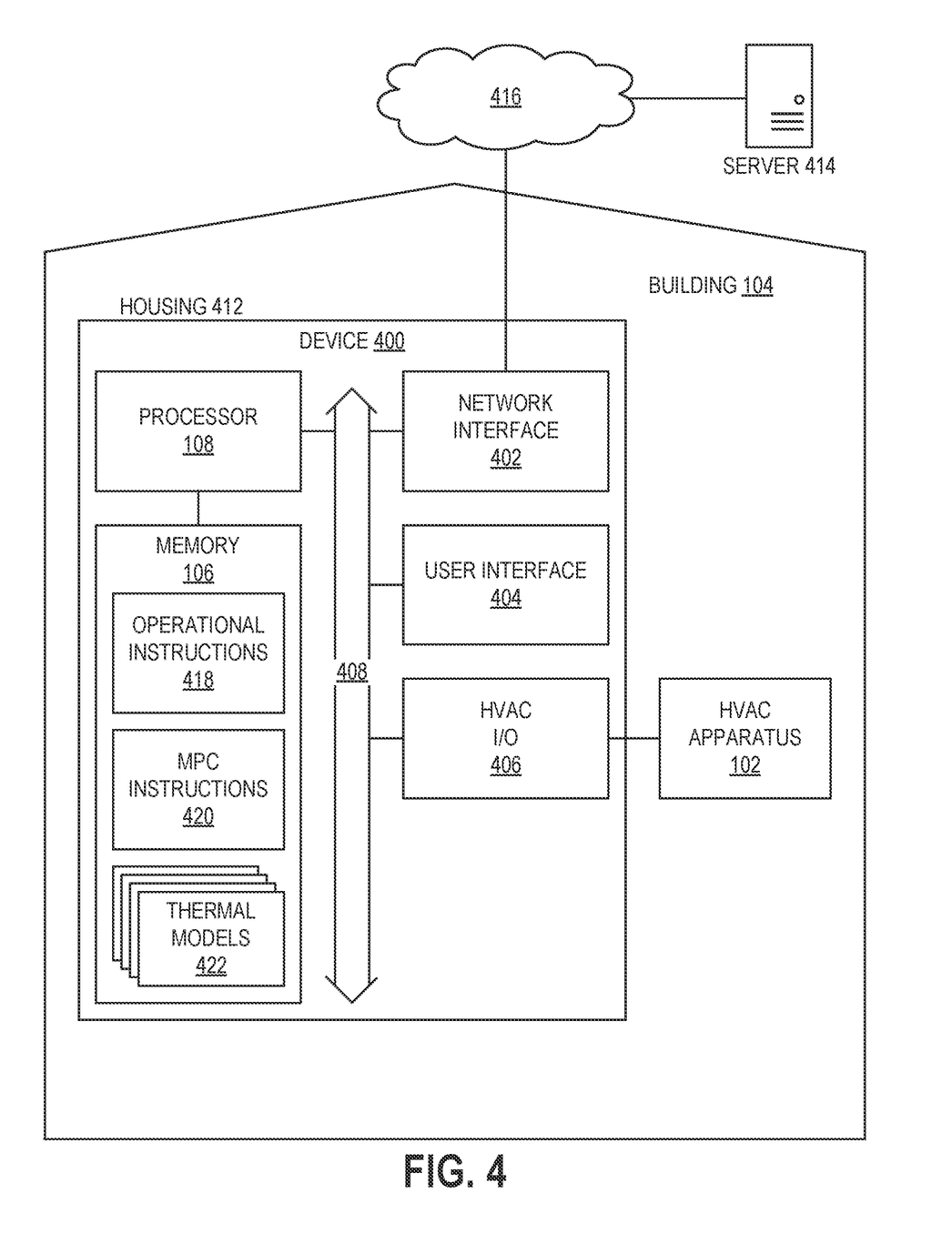
FIG. 4 is a block diagram of another example HVAC control device according to the present invention.

FIG. 4 shows another example HVAC control device 400 to control an HVAC apparatus 102 of a building 104. The device 400 includes various components, such as a processor 108 and memory 106, already discussed with regard to the device 100. The device 400 further includes a network interface 402, a user interface 404, and an HVAC input/output (I/O) circuit 406. The components of the device 400 may be interconnected via a bus 408 or similar circuit.

The processor 108, memory 106, and other components 402-408 of the device 400 are contained within a housing 412 that is positionable within the building 104. The housing 412 may be configured to be attached to a wall of the building 104 or be placed on a surface inside the building 104, such as a table or shelf. As will be discussed below, the device 400 is capable of communications via a wide-area network but performs MPC internally with the processor 108 and memory 106. This provides greater efficiency, in that MPC computations are performed at the location where MPC control is performed, and less reliance network resources, which can free up network bandwidth for other uses and can provide robustness against network outages.

The network interface 402 may include hardware and software components, such as a network adaptor and driver, to provide for data communications with a server 414 via a wide-area computer network 416 such as the internet. The network interface 402 may connect to the wide-area computer network 416 via a local-area network (e.g., Wi-Fi) that serves the building 104. An example server 414 may provide information to the device 400, such as a price of energy, disturbance data (e.g., weather data), template or fully configured thermal models, orchestration commands or constraints to operate a group of devices 400 with large-scale constraints or objectives, such as avoiding undue load to an electrical grid.

The user interface 404 may include a touchscreen, physical buttons, a microphone and speaker, or other device capable of communication with an occupant of the building 104.

The HVAC I/O circuit 406 connects to the HVAC apparatus 102 and communicates signals between the device 400 and the HVAC apparatus 102, such as a setpoint, mode select, and/or other operational parameters for the HVAC apparatus 102. The HVAC I/O circuit 406 may include wiring terminals and signaling hardware compatible with the HVAC apparatus 102.

The device 400 includes operational instructions 418 that control the overall operations of the device 400, such as network communications, user interface operations, scheduling, selection of an MPC model, generation of an MPC model, training of an MPC model, and/or handoff between MPC and reactive control.

The device 400 includes MPC instructions 420 that implement model predictive control for the HVAC apparatus 102 with a thermal model 422 that may be selected from an ensemble of thermal models 422. The MPC instructions 420 execute a simulation based on a given thermal model 422. The MPC instructions 420 may execute a plurality of simulation based on respective thermal models 422.

The operational instructions 418 may generate or download a thermal model 422 after the device 400 is deployed to the building 104, may select a thermal model 422 for execution by the MPC instructions 420, may set an interval for execution of the MPC instructions 420, may disable MPC if a thermal model 422 is ineffective or erroneous, and may provide other management functions to the device 400 with regard to MPC.

Figure 5:
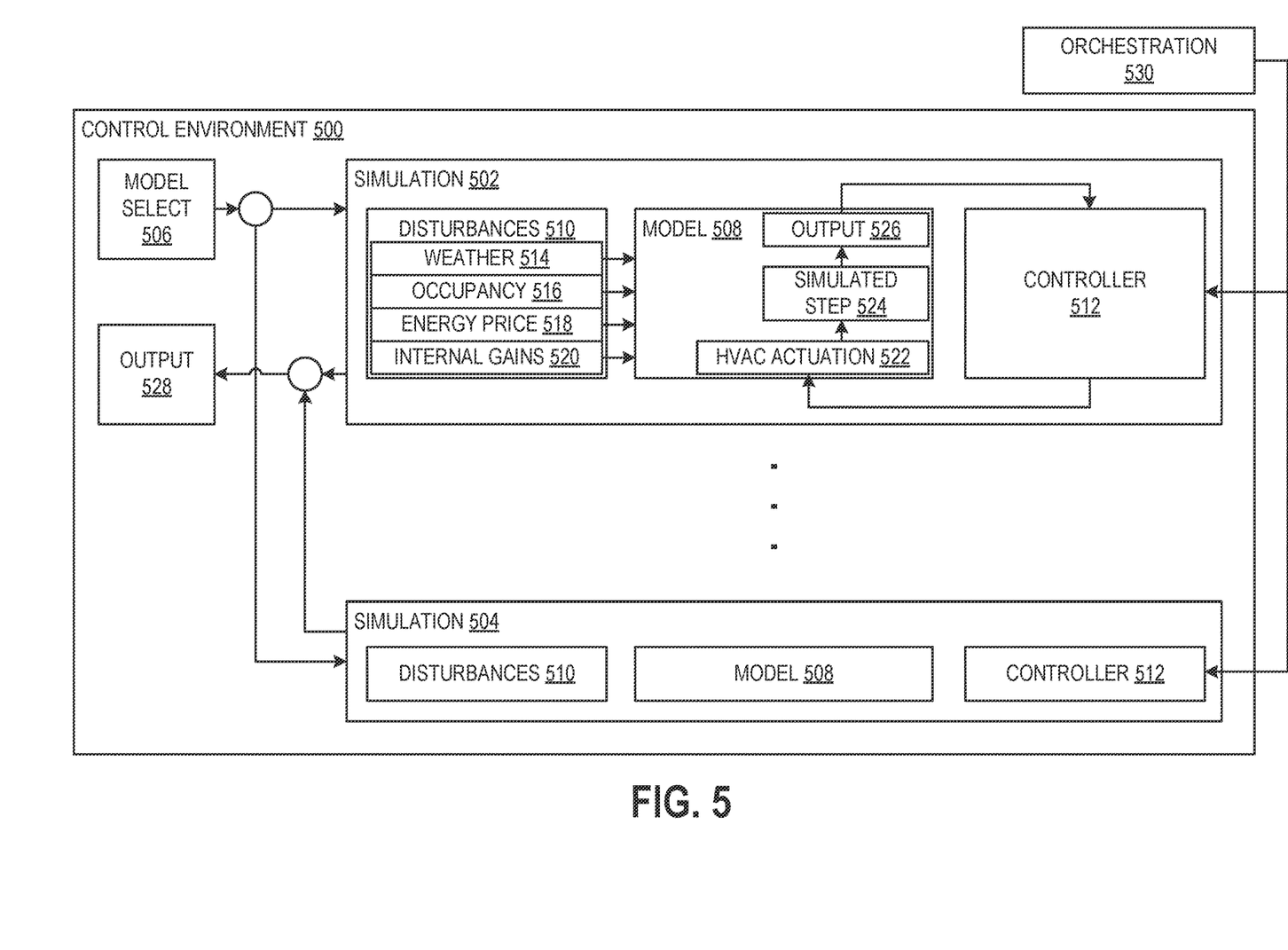
FIG. 5 is a schematic diagram of example execution of model predictive control according to the present invention.

With reference to FIG. 5, the operational instructions 418, MPC instructions 420, and thermal models 422 may cooperate to execute MPC simulations in a control environment 500 that may reside in memory 106 and be executed by the processor 108 of the HVAC control device 400.

Different MPC simulations 502, 504 may be executed as selected by a model select input 506, which, as discussed above, may reference HVAC apparatus setpoint, mode, time information, or a combination of such. While any suitable number of MPC simulations 502, 504 may be provided, it is preferable that one MPC simulation 502, 504 be executed at a given time, so as to reduce the computational resources consumed.

Each MPC simulation 502, 504 includes a thermal model 508 of the building 104, disturbances 510, and a controller 512. A particular thermal model 508, set of disturbances 510, and controller 512 may be used in multiple different simulations 502, 504, but each MPC simulation 502, 504 should have a unique set of: thermal model 508, disturbances 510, and controller 512.

Disturbances 510, as discussed above, may include weather 514, occupancy 516, changes in energy price 518, and internal gains 520. A disturbance 510 may be measured, approximated, or otherwise characterized.

A thermal model 508 may be configured with thermal properties of the building 104 and its envelope, operational output characteristics of the HVAC apparatus 102, and the disturbances 510. The model 508 may accept an HVAC actuation signal 522 from the controller 512, perform a simulated step 524 to compute a simulated result of the HVAC actuation signal 522 on the thermal model 508, and provide a corresponding output 526 to the controller 512. The HVAC actuation signal 522 may, for example, be a command to turn on or off the HVAC apparatus 102 or drive the HVAC apparatus 102 to a specified level of output. The output 526 may be, for example, the resulting state or condition in the building 104, such as its indoor temperature.

The controller 512 may include a proportional (P) controller, proportional-integral (PI) controller, proportionalintegral-derivative (PID) controller, or other class of controller. For purposes of simulation, the controller may provide an HVAC actuation signal 522 to the model 508 and take as input a resulting output 526 condition from the model.

Output 528 may be taken from the selected simulation 502, 504 to effect MPC for the HVAC apparatus 102. Output 528 may include an HVAC actuation 522 generated by the controller 512 and the HVAC actuation 522 may be provided to the HVAC apparatus 102.

Output 528 may further include the output 526 of a sequence of simulated steps 524 of the selected simulation 502, 504. If the output 526 of the sequence of simulated steps 524 conforms to expected, then the HVAC actuation 522 corresponding to the first step 524 of the sequence of simulated steps 524 may be considered valid and thus provided to the HVAC apparatus 102 to effect MPC of the HVAC apparatus 102. The selected simulation 502, 504 may continue to generate the sequence of simulated steps 524 and the HVAC actuation 522 corresponding to the oldest step 524 may be taken as the control input for the HVAC apparatus 102, provided that the sequence of simulated steps 524 continues to provide expected or reasonable output 526.

There may be situations where MPC is not suitable. The output 528 may be analyzed to compute an error between a sensed HVAC condition of the building 104 a predicted HVAC condition predicted by the selected simulation 502, 504. When the error is determined to exceed an error tolerance, MPC may be disabled and a traditional reactive control algorithm may be enabled to control of the HVAC apparatus 102. For example, a controller 512 of a simulation 502, 504 may be operated without the model 508, such that a measured HVAC condition of the building 104 may be provided to the controller 512 and an HVAC actuation 522 outputted by the controller 512 may be taken as a command to the HVAC apparatus 102. The controller 512 may thus be operated in a reactive manner to directly control operation of the HVAC apparatus 102 without use of the model 508. It may be useful to fallback to reactive control if MPC results in error. A simulation 502, 504 may be attempted at intervals during reactive control to determine whether the error is sufficiently reduced to switch back to MPC.

Error may also be a basis for switching among simulations 502, 504. If a selected simulation 502, 504 results in error, then another simulation 502, 504 may be selected. If all simulations 502, 504 result in error, then reactive control may take over, as discussed above.

Orchestration 530 may be applied to the simulations 502, 504 of a control environment 500 of an HVAC control device 400 or the control environments 500 of a plurality (fleet) of devices 400. Orchestration 530 may include directives to the controllers 512 and/or the thermal models 508 concerning price of energy, load shaping, and other factors that affect a group of simulations 502, 504 and/or devices 400. Orchestration 530 may provide for energy/cost savings with a large number of devices 400 irrespective of individual savings or lack thereof at a particular device 400.

Figure 6:
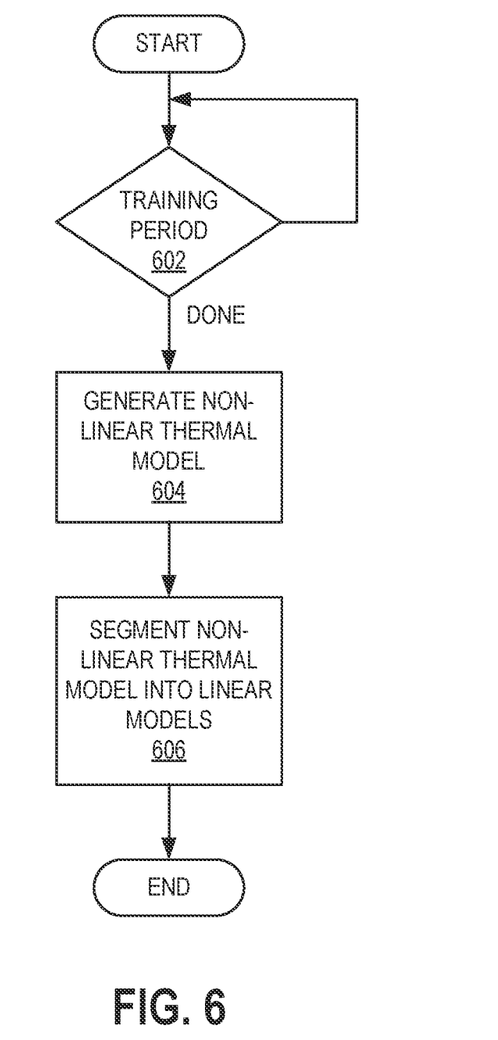
FIG. 6 is a flowchart of example generation of linear thermal models according to the present invention.

With reference to FIG. 6, a plurality of linear thermal models may be generated at an HVAC control device 100, 400 installed within a building 104.

At block 602, the device may be initially installed and operated during a training period. The training period may span one week, two weeks, one month, or similar duration. The intent of the training period is to characterize the thermal response of the building and to quantify disturbances, such as disturbances due to occupancy, for example, internal gains due to occupants coming and going, heat losses/gains due to doors being opened/closed, etc.

During the training period, an HVAC apparatus may be controlled using reactive control and the response of the building's HVAC condition may be measured. The HVAC apparatus may be controlled to provide specific inputs to the building to evoke various responses from the building. As such, the building's HVAC response may be characterized over a range of HVAC operation and this information along with the HVAC apparatus inputs may be used to generate a thermal model of the building, at block 604. Such a generated thermal model may be non-linear. Model generation may include applying specific parameters to a template model or using machine learning.

If the generated thermal model is non-linear, the device may perform a piecewise segmentation to generate a plurality of linear thermal models, at block 606.

Figure 7:
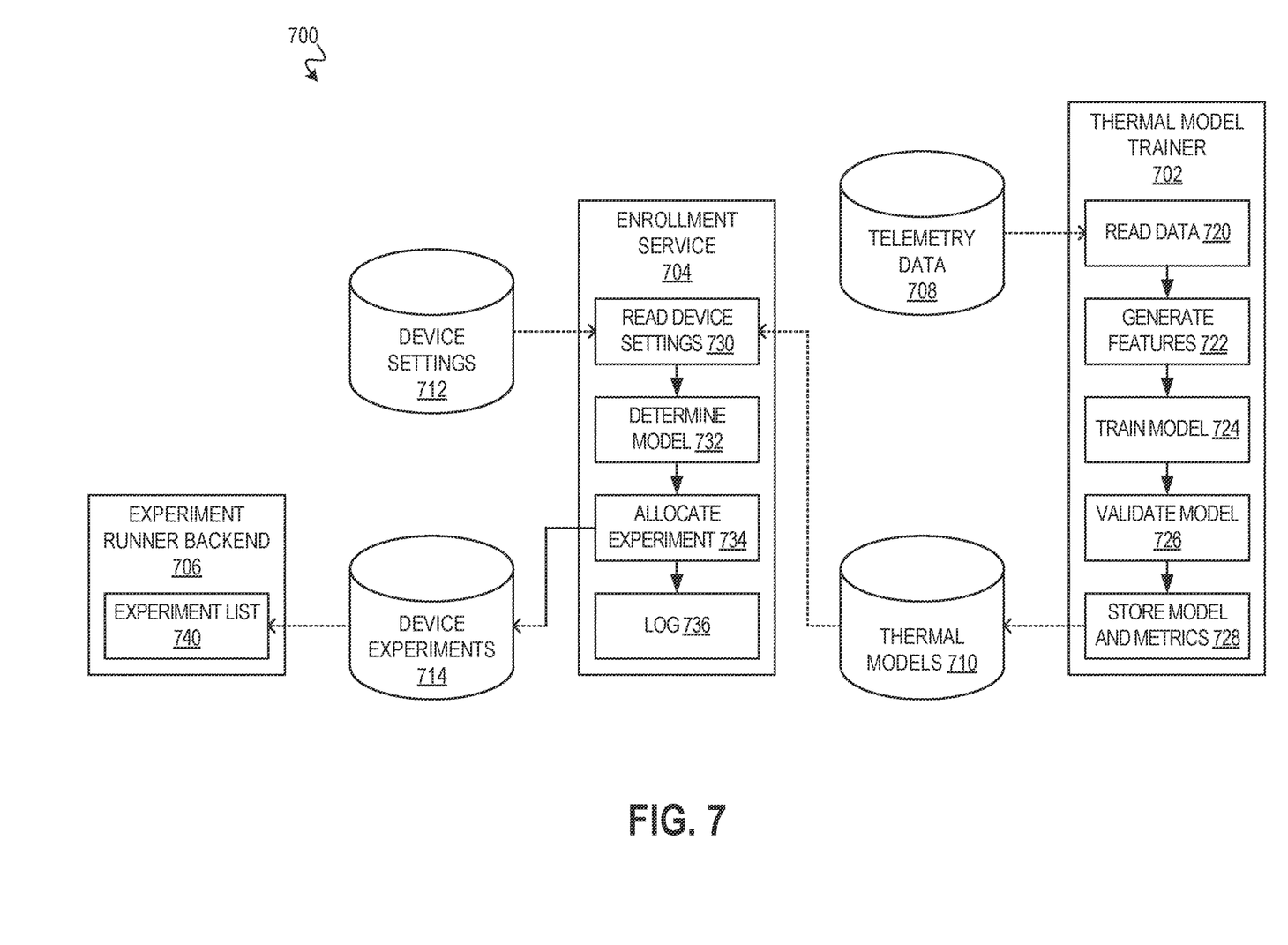
FIG. 7 is a block diagram of an example system to generate thermal models and deploy model predictive control experiments to HVAC control devices.

FIG. 7 shows an example system 700 configured to generate thermal models and deploy MPC experiments to HVAC control devices, such as devices 100, 400. A MPC experiment may be considered an MPC simulation that uses a linear model and that may include other techniques discussed herein. An example experiment may look ahead by about 1 to 12 hours.

The system 700 includes a thermal model trainer 702, an enrollment service 704, and an experiment runner backend 706. The system 700 may be implemented by one or more cooperating computing devices, which may be termed servers and which each may include a processor and non-transitory machine-readable medium.

Data resources used the system 700 include telemetry data 708, thermal models 710, device settings 712, and experiments 714. Data may be stored in one or more databases and, if appropriate, regularly or periodically updated based on communications with HVAC devices that the system 700 serves.

Telemetry data 708 includes settings, sensor data, status messages, and other information that is provided by the HVAC devices.

The thermal model trainer 702 uses the telemetry data 708 to generate thermal models 710. The thermal model trainer 702 may include instructions that implement a processor-executable method that includes reading telemetry data (block 720), generating features (block 722) from the data, training a thermal model (block 724), validating the thermal model (block 726), and storing the model and any associated metrics (block 728) in the thermal model repository 710.

Generating features, at block 722, may include using deterministic algorithms to compute feature data from the telemetry data 708, where such feature data describes variance in operations among a multitude of deployed HVAC devices. Alternatively or additionally, a machine learning model may be used to generate features from telemetry data 708.

Training a thermal model, at block 724, may be carried out as discussed elsewhere herein and may use other MPC techniques as well. A wide range of different thermal models 710 may thus be generated and stored based on telemetry data 708 from a population of deployed HVAC control devices.

The enrollment service 704 uses device settings 712 and thermal models 710 to implement experiments 714 at various HVAC control devices. The enrollment service 704 may include instructions that implement a processor-executable method that includes reading device settings, at block 730, from a HVAC control device that is to run an experiment. Note that device settings 712 may be a subset of the telemetry data 708 and/or may be separated stored and curated from the telemetry data 708. The method may further include determining a model, at block 732, that is suitable for the particular HVAC control device. Thermal models 710 may be stored with associated metrics that describe their usability with HVAC control devices. Determining the model, at block 732, may include comparing the settings of the HVAC control device in question with metrics associated the thermal models 710 to find a good fit. Determining the model, at block 732, may also include determining whether the HVAC control device has hardware, software, and/or firmware suitable for executing an experiment. An experiment with a selected thermal model 710 may thus be allocated, at block 734, to a HVAC control device and the result may be logged, at block 736.

The experiment runner backend 706 may track a list 740 of experiments 714 and manage execution of the experiments 714. The experiment runner backend 706 may include an application programming interface (API) or other interface to the database of experiments 714. The experiment runner backend 706 may be configured to receive and respond to queries from deployed HVAC control devices. An HVAC control device may query the experiment runner backend 706 to determine whether an experiment 714 exists for the device and, if so, to initiate execution of the experiment 714 locally at the HVAC control device at the deployed location.

Figure 8:
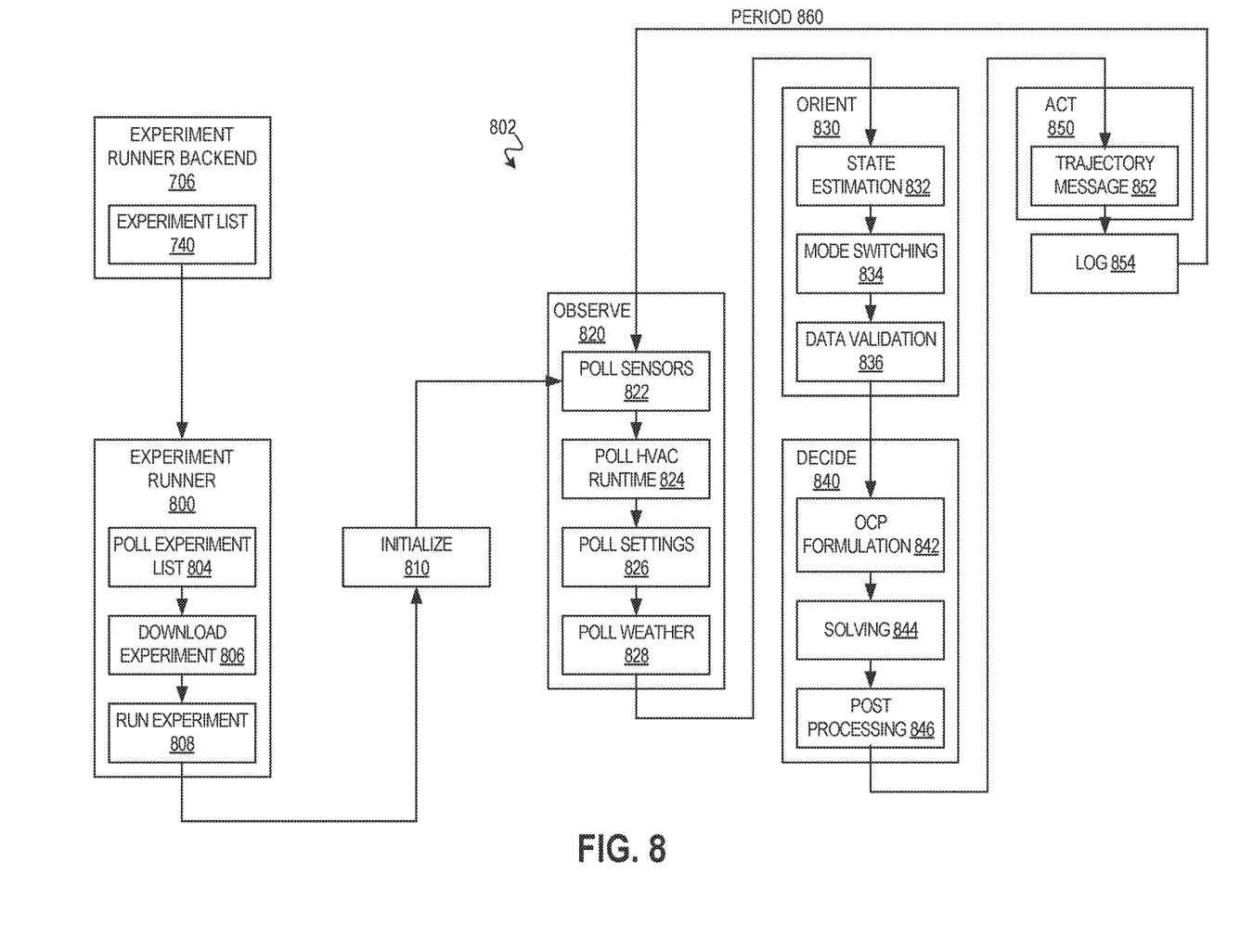
FIG. 8 is a flowchart of an example method to receive and conduct a model predictive control experiment with an HVAC control device.

FIG. 8 shows an example experiment runner 800 and example method 802 to receive and conduct a model predictive control experiment with an HVAC control device. The experiment runner 800 may be executed by an HVAC control device, such as the device 100, 400, to operate as a host for executing experiments at an HVAC control device.

The experiment runner 800 may communicate with the experiment runner backend 706 at the system 700 of FIG. 7. This communication may be made via a wide-area computer network, such as the internet, that connects the system 700 to a fleet of HVAC control devices. The experiment runner 800 may obtain different experiments with different thermal models from the experiment runner backend 706, where one such obtained experiment and thermal model may be selected for execution based on HVAC apparatus setpoint or other consideration, as discussed elsewhere herein.

The initiate an experiment, the experiment runner 800 may poll the experiment list 740, at block 804, maintained by the experiment runner backend 706 to determine whether an experiment exists for the HVAC control device. If an experiment exists, the experiment may be downloaded, at block 806, and run, at block 808.

An experiment may include four phases: initialization (block 810), observation (block 820), orientation (block 830), decision (block 840), and action (block 850). The observation, orientation, decision, and action phases may be performed in sequence periodically after the initialization phase and according to a period 860, such as 10, 15, 30 seconds, or similar interval.

Initialization at block 810 may include reading experiment and thermal model parameters, initializing components of the HVAC control device that will perform the experiment, and allocating memory. After initialization, the observation phase, at block 820, is performed.

The observation phase, at block 820, includes collecting data, such as polling sensors (block 822), polling HVAC runtime (block 824), polling settings (block 826), and polling weather (block 828).

Block 822 may include obtaining current and historic sensor data, such as temperature, humidity, and similar sensor data collected by the HVAC control device.

Block 824 may include obtaining current and historic state of the HVAC apparatus controlled by the HVAC control device, such as whether the apparatus is on or off.

Block 826 may include obtaining current and historic settings for the HVAC control device, such as a setpoint and commanded operational mode for the HVAC apparatus.

Block 828 may include obtaining current and historic weather information, such as outdoor ambient temperature, humidity, wind speed, solar radiation, and so on.

After the observation phase, the orientation phase, at block 830, is performed.

The orientation phase, at block 830, puts the observed data into context by transforming information collected during the observation phase, at block 820, into a form compatible with the experiment.

At block 832, a state of the building controlled by the HVAC control device is estimated using the data collected during the observation phase, at block 820. A predetermined time range of historic data may be selected, such as the 5, 10, 15, 20, or 25 minutes, to conform with the time range considered by the thermal model that underpins the experiment. The data may be resampled, for example, from the period 860 (e.g., 15 seconds) to the period considered by the thermal model (e.g., 300 seconds).

At block 834, the operational mode of the HVAC apparatus is determined. For example, the HVAC apparatus may be in a heating mode, a cooling mode, or a recovery mode where a heating/cooling mode is switched early to anticipate a setpoint. Mode may be directly reported by the collected data or may be derived from the collected data.

At block 836, the oriented data is then validated. If anomalous or erroneous data is detected, then the experiment may be halted.

After the orientation phase, the decision phase, at block 840, is performed. The decision phase includes optimal control problem (OCP) formulation (block 842), solving (block 844), and post processing (block 846).

At block 842, the experiment may be structured as a constrained linear quadradic OCP with a linear thermal model, as discussed elsewhere herein, including constraints and a cost function. This provides a simplified MPC simulation that is readily solvable by the HVAC control device at the location of the HVAC apparatus without requiring server-based processing capabilities. The experiment and thermal model may be structured to predict the next 1 to 12 hours of operation of the HVAC apparatus.

At block 844, the problem is solved to obtain a decision variable, such as an on/off command for the HVAC apparatus or a runtime (e.g., operate for 1 minute) for the HVAC apparatus.

At block 846, non-modeled constraints that are not part of the thermal model may be applied. Providing such constraints outside the thermal model may allow for greater simplification of the model to allow the OCP to be solved at the HVAC control device. Examples of non-modeled constraints include a minimum runtime of the HVAC apparatus and a maximum runtime of the HVAC apparatus, which may be established to limit cycling of the HVAC apparatus to reduce wear and prolong service life.

After the decision phase, the action phase, at block 850, is performed.

At block 852, a trajectory message may be generated for the control circuitry of the HVAC control device. The trajectory message may include a setpoint, desired runtime, or similar information. The trajectory message may be communicated to the control circuitry to effect control of the HVAC apparatus based on the experiment and thermal model.

Data related to the experiment and its results may be logged, at block 854.

After the decision phase, the observation phase, at block 820, may be performed again. The phases 820, 830, 840, 850 may repeat in a cycle governed by the period 860. The experiment may thus be continuously performed to effect MPC of the HVAC apparatus.

In view of the above it should be apparent that MPC can be facilitated for HVAC by selecting a thermal model from among various thermal models, particularly linear thermal models. This realizes the advantages of MPC while controlling its drawbacks, such as the required computational resources.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:
    memory storing a first thermal model of a building and a second thermal model of the building;
    a processor connected to the memory, the processor configured to:
        obtain an operational parameter of a heating, cooling, ventilation, and/or air conditioning (HVAC) apparatus at the building;
        compare the operational parameter to a threshold;
        when the operational parameter exceeds the threshold, select the first thermal model as a selected thermal model;
        when the operational parameter does not exceed the threshold, select the second thermal model as the selected thermal model; and
        execute model predictive control using the selected thermal model to control the HVAC apparatus at the building;
        determine an error between a sensed HVAC condition of the building and a predicted HVAC condition predicted by the selected thermal model; and
        when the error exceeds an error tolerance, disable the model predictive control and enable a reactive control algorithm to control the HVAC apparatus.

2. The device of claim 1, wherein the operational parameter is a setpoint of the HVAC apparatus.

3. The device of claim 1, wherein the operational parameter is a mode of the HVAC apparatus.

4. The device of claim 1, wherein the operational parameter is a time.

5. The device of claim 1, wherein the first thermal model and the second thermal model are linear models.

6. The device of claim 1, wherein each of the first and second thermal models model:
    a building envelope;
    an operational output of the HVAC apparatus; and
    a disturbance.

7. The device of claim 6, wherein the disturbance comprises solar heating, wind, a building occupant, appliance heat generation, or a door being opened or closed.

8. The device of claim 6, wherein each of the first and second thermal models further models a thermal mass of furniture in the building.

9. The device of claim 1, wherein the processor is further configured to generate the first thermal model and the second thermal model.

10. The device of claim 1, wherein the processor is further configured to:
    generate a non-linear thermal model of the building; and
    perform a piecewise segmentation on the non-linear thermal model to generate the first and second thermal models.

11. The device of claim 10, wherein the processor is further configured to generate the non-linear thermal model of the building during a training period of operation of the HVAC apparatus.

12. The device of claim 1, wherein the model predictive control is configured with a comfort constraint and an objective to minimize an operating cost of the HVAC apparatus due to a price of energy.

13. The device of claim 12 further comprising a network interface connected to the processor, the network interface to receive the price of energy from a computer network.

14. The device of claim 1, wherein the model predictive control is configured with a comfort constraint and an objective to minimize an operating cycle frequency of the HVAC apparatus.

15. The device of claim 1, wherein the processor is configured to execute the model predictive control at predetermined intervals.

16. The device of claim 1, further comprising a housing containing the memory and the processor.

17. The device of claim 16, wherein the housing is configured to be attached to a wall of the building or be placed on a surface inside the building.

18. The device of claim 1, further comprising a network interface connected to the processor, wherein the processor is configured to execute the model predictive control irrespective of an availability of a network connection at the network interface.

* * * * *